(12) United States Patent
Quero et al.

(10) Patent No.: US 8,087,245 B2
(45) Date of Patent: Jan. 3, 2012

(54) SOLAR CONCENTRATOR PLANT

(75) Inventors: Valerio Fernandez Quero, Seville (ES); Marcelino Sanchez Gonzalez, Alcorcon-Madrid (ES); Rafael Osuna Gonzalez-Aguilar, Seville (ES)

(73) Assignee: Abengoa Solar New Technologies, S.A., Avda, De la Buhaira, Seville (ES)

( * ) Notice: Subject to any disclaimer, the term of this patent is extended or adjusted under 35 U.S.C. 154(b) by 341 days.

(21) Appl. No.: 11/729,336

(22) Filed: Mar. 28, 2007

(65) Prior Publication Data

US 2008/0029150 A1 Feb. 7, 2008

(30) Foreign Application Priority Data

Aug. 4, 2006 (ES) .................................. 200602134

(51) Int. Cl.
*F03G 6/00* (2006.01)
*F03G 7/00* (2006.01)
*B60K 16/00* (2006.01)

(52) U.S. Cl. .................. 60/641.15; 60/641.8; 60/641.11
(58) Field of Classification Search ............... 60/641.11, 60/641.15, 641.8
See application file for complete search history.

(56) References Cited

U.S. PATENT DOCUMENTS

| | | | | |
|---|---|---|---|---|
| 3,868,823 A * | 3/1975 | Russell et al. | ............. | 60/641.15 |
| 3,950,949 A * | 4/1976 | Martin et al. | ................ | 60/641.8 |
| 4,010,732 A * | 3/1977 | Sawata et al. | ................ | 126/688 |
| 4,387,574 A * | 6/1983 | Becker et al. | ............. | 60/641.11 |
| 4,449,517 A * | 5/1984 | Tani et al. | ...................... | 126/643 |
| 5,228,293 A * | 7/1993 | Vitale | ........................ | 60/641.14 |
| 2005/0126170 A1 * | 6/2005 | Litwin | ........................ | 60/641.8 |

* cited by examiner

*Primary Examiner* — Thomas Denion
*Assistant Examiner* — Christopher Jetton
(74) *Attorney, Agent, or Firm* — John C. McMahon

(57) ABSTRACT

Which, using a heat transfer fluid in any thermodynamic cycle or system for using process heat, comprises:
two-dimensional solar concentrator means for heating the heat transfer fluid from a temperature T1 to a temperature T2;
three-dimensional solar concentrator means for overheating the heat transfer fluid from a temperature T2 to a temperature T3;
such that the advantages of working at high-temperatures of the three-dimensional solar concentrator means are taken advantage of with overall costs similar to those of two-dimensional solar concentrator means.
In a specific application for generating electric power, the two-dimensional solar concentrator means consist of a parabolic trough collector (1), while the three-dimensional solar concentrator means consist of a heliostat field and central tower (2) for generating overheated steam that expands in a turbine (6) coupled to an electric generator (7).

13 Claims, 1 Drawing Sheet

SOLAR CONCENTRATOR PLANT

The present invention relates to an installation that intends to provide results that are more efficient and less expensive than current solar concentration technologies. Its application lies mainly in the fields of electricity generation, process heat and solar fuels, as well as in thermo-chemical processes.

BACKGROUND OF THE INVENTION

Although solar radiation is a high-temperature and high-power heat source at its origin, its use in the flux conditions when it arrives at the Earth's surface almost eliminates its potential to be converted to work, due to the dramatic reduction in the temperature available in the flux. For this reason, thermoelectric solar plants (TSP) resort to optical concentration systems that allow obtaining greater flux densities and thereby higher temperatures. Consider a simplified model of a thermosolar concentration system consisting of an ideal optical concentrator, a solar receiver that behaves as a black body with losses due only to emission (a cavity receiver or a volumetric receiver will theoretically approach this condition) and a thermal machine or motor with an ideal Carnot efficiency. The total yield of this system will mainly depend on the efficiency of the receiver system and of the thermodynamic cycle. The efficiency of the solar receiver system can be expressed in a very simplified manner by Equation 1, where $Q_{in}$ is the inbound energy supply and $Q_{loss}$ is the thermal losses of the system. As the inbound energy is proportional to the concentration and thermal losses depend mainly on the process temperature, it can be said that the higher the concentration, the greater the efficiency of the solar receiver system for a given process temperature. In other words, in order to work at high temperatures, to increase the efficiency of the receiver system we must increase the concentration. That is, the efficiency of solar receivers will increase with high concentrations and low process temperatures.

On another hand, Equation 2 shows the efficiency of an ideal thermodynamic cycle (the Carnot cycle), the efficiency of which increases with temperature. The overall efficiency of the thermosolar system will be determined by the product of the two, as shown in Equation 3. To increase the overall efficiency of the system we must increase the concentration, to allow working at high temperatures and high overall efficiency.

$$\eta_{receiver} = \frac{Q_{in} - Q_{loss}(T)}{Q_{in}} \quad [1]$$

$$\eta_{Carnotcycle} = \frac{T - T_0}{T} = 1 - \frac{T_0}{T} \quad [2]$$

$$\eta_{TOTAL} = \eta_{receiver} * \eta_{Carnotcycle} = \left(\frac{Q_{in} - Q_{loss}(T)}{Q_{in}}\right) * \left(1 - \frac{T_0}{T}\right) \quad [3]$$

From a thermodynamic point of view, there are concentration limits that differ depending on whether the concentration is effected in three dimensions (3D) or in two dimensions (2D). Namely, the concentration limit depends on the acceptance angle, this is, the size, shape and distance of the object to be found, in this case the sun, whose angle is 4.65 mrad.

$$C_{max(2D)} = \frac{n}{\sin(\theta_a)}; \quad C_{max(2D)} \leq 215 \quad C_{max(3D)} = \frac{n^2}{(\sin(\theta_a))^2}; \quad [4]$$

$$C_{max(3D)} \leq 46000$$

As the theoretical concentration limits are much higher in the case of three-dimensional concentration systems than in two-dimensional systems, why have early commercial experiences applying solar concentration systems to generate electricity been based on two-dimensional concepts, as with parabolic trough concentrators? The reason is that in two-dimensional concentrators it is possible to use single-axis tracking systems to reach concentrations on the order of 20-80× and working temperatures of about 400° C. Three-dimensional systems, however, require two-axis tracing systems, which are much more complex, and generally reach concentrations of 300-2000× and working temperatures of up to 1000° C. It should be recalled that there are currently three different techniques developed for use in Thermoelectric Solar Plants: parabolic trough systems, central receiver systems and Stirling dish systems. These use only the direct component of solar radiation, which requires them to have solar tracking devices.

1. In parabolic trough collectors (2D), direct solar radiation is reflected by parabolic mirrors that concentrate the radiation in a receiver or absorber trough in which flows a fluid that is heated by the concentrated solar radiation to maximum temperatures of 400° C. In this way, solar radiation is converted into thermal energy that is later used to generate electricity by a Rankine water/steam cycle. A variation of this technology is Fresnel linear concentration systems, in which the parabolic mirror is replaced by a Fresnel discrete array with smaller mirrors that can be flat or have a slight axial curvature; controlling their axial orientation allows concentrating solar radiation on the absorber tube, which in this type of applications is generally stationary.

2. Central receiver systems (3D) use large mirrors (40-125 m² each) known as heliostats, provided with a control system for reflecting direct solar radiation on a central receiver placed at the top of a tower. In this technique, the concentrated solar radiation heats a fluid in the receiver to temperatures of up to 1000° C. and this thermal energy is then used to generate electricity.

3. Stirling dish systems (3D) use a surface of mirrors mounted on a parabola of revolution to reflect and concentrate sunlight at a focal point where the receiver is placed, heating the working fluid of a Stirling engine that is used to drive a small electric generator.

Although all of the aforementioned techniques are at an early commercialization stage and it is too early to give conclusive cost estimates, we may say a priori that three-dimensional concentrator systems allow reaching higher working temperatures, and thus will increase the efficiency of the thermodynamic cycle employed, although in order to reach these concentrations they require high-precision 2-axis tracking systems, which can increase the cost per m² built with respect to two-dimensional concentrator systems.

Therefore, an object of the present invention is to provide a system that is technically more efficient and economically more competitive.

DESCRIPTION OF THE INVENTION

The concept of the solar concentrator plant of the invention is based on integrating the advantages of two-dimensional systems, such as parabolic trough collectors (PTC) for increasing the temperature of the heat transfer fluid to the medium temperatures at which these types of systems are more efficient, and those of three-dimensional concentrator systems such as tower systems and heliostat fields, which allow reaching high temperatures, using the latter mainly to overheat the heat transfer fluid beyond the temperature already attained using the two-dimensional systems, to temperatures that allow a more efficient integration in the thermodynamic cycle. From the point of view of the cost of the installation, using three-dimensional concentration techniques for the initial heating stage is more costly than using two-dimensional heating systems for this stage. Currently, either two-dimensional concentration systems are used for both stages that cannot reach the optimum operation temperatures for the thermodynamic cycles, or more costly three-dimensional concentration systems. The combination of the two allows reaching high temperatures and therefore high yields of the thermodynamic cycles requiring neither high-accuracy nor two-axis tracking devices for the entire solar concentrator system, which leads to a significant reduction in costs.

Thus, the heat transfer fluid with an initial temperature T1 is heated by a two-dimensional concentrator system to a temperature T2, and then stored or reheated by a fossil fuel support (in hybrid systems when there is insufficient solar power supply) or by a three-dimensional solar concentrator system (when there is sufficient solar power supply) to the temperature T3, and then either stored to increase the capacity factor of the plant or sent directly to the existing thermodynamic cycle.

In this way, both two- and three-dimensional concentration techniques are used in a more efficient and less costly manner, allowing the adapting of the temperature of the heat transfer fluid to the hot point of the thermodynamic cycle to the conditions providing greatest efficiency.

BRIEF DESCRIPTION OF THE FIGURES

To complete the description being made and in order to aid a better understanding of the characteristics of the invention, a detailed description will be made of a preferred embodiment based on a set of drawings accompanying this descriptive memory where, for purposes of illustration only and in a non-limiting sense, the following is shown.

Figure 1:
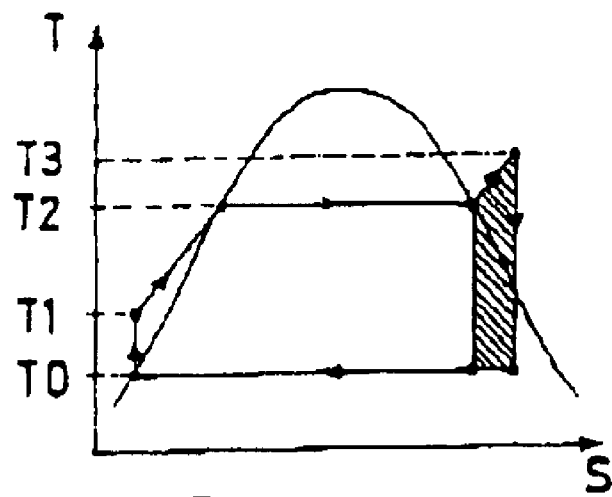
FIG. 1 shows a Rankine thermodynamic cycle as used in a preferred embodiment of the invention.

In the aforementioned figures, the numerical references correspond to the following parts and components:
1. Parabolic trough collector
2. Heliostat field and central tower
3. Low-temperature thermal storage
4. High-temperature thermal storage
5. Fossil fuel support
6. Turbine
7. Electric generator
8. Condenser
9. Compressor.

DETAILED DESCRIPTION OF A PREFERRED EMBODIMENT

A detailed description will be given next of an application of the invention for generating electrical power, using a Rankine thermodynamic cycle. In this specific case the parabolic trough technology is selected as the two-dimensional sc technique and the central receiver technology is selected as the three-dimensional sc technique.

In Rankine thermodynamic cycles, most of the energy supplied to the cycle is supplied in the evaporation at constant temperature stage. Only the overheating stage requires the use of high temperatures. In the application of the combined plant of the invention to a Rankine cycle, it is proposed to use PTC technology for the heating and evaporation stages and possibly for a slight overheating to a maximum temperature of 400° C., then using central receiver technology only in stages requiring high process temperatures above 400° C. (the overheating stage reaches temperatures even higher than 550° C. in conventional overheated Rankine cycles).

As shown in FIG. 1, the cycle comprises four processes. Starting at the lowest temperature T0, the heat transfer fluid is pumped to the temperature T1 where it is heated at constant pressure by a two-dimensional concentrator system to the temperature T2. It is then heated by a three-dimensional concentrator system to temperature T3, where it is expanded in a turbine until it recovers its original temperature T0, closing the cycle with a condenser that converts the saturated vapor into a liquid.

Figure 2:
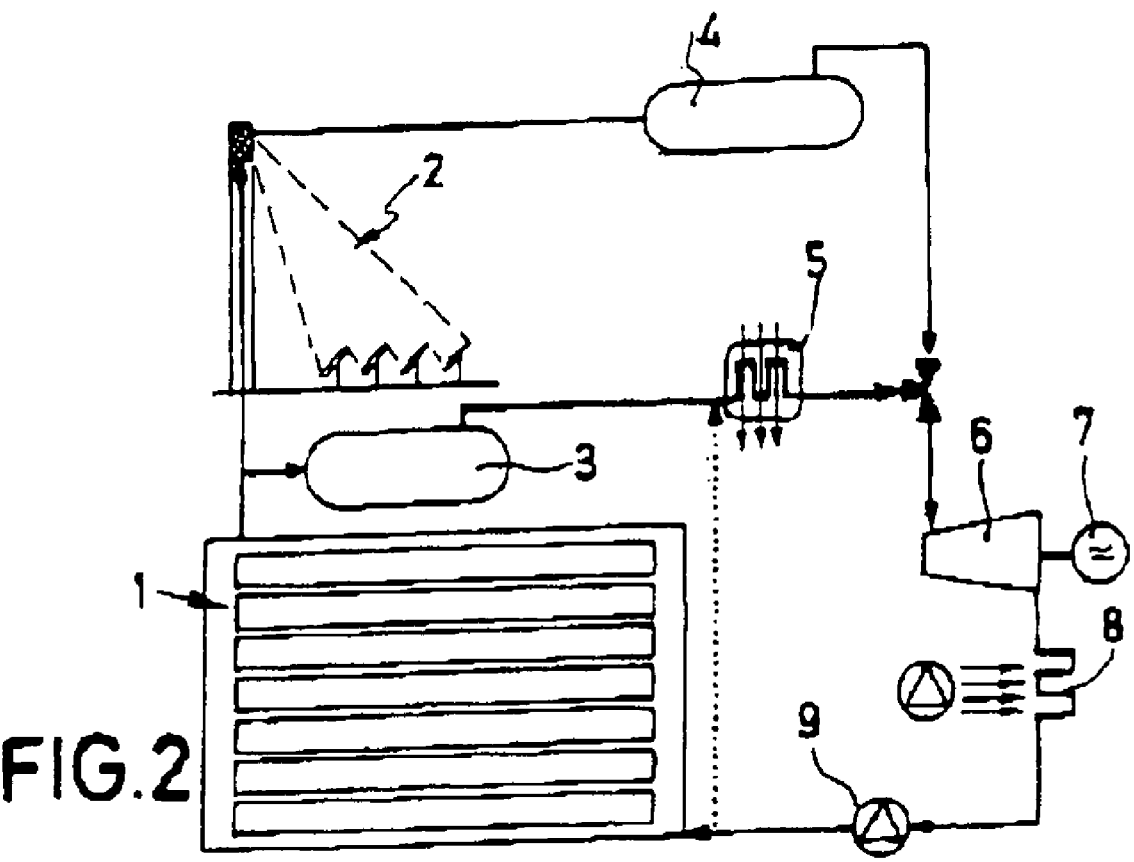
FIG. 2 shows a schematic representation of the plant, as used in a preferred embodiment of the invention.

As shown in FIG. 2, this plant will typically comprise the following:
a) Two-dimensional sc means (including the receiver) consisting of a parabolic trough collector (1) for generating saturated or slightly overheated vapor. This device will typically allow supplying heat to the water arriving from the condenser to raise its temperature from approximately 50° C. to 250° C. or 330° C. if saturated vapor is used (depending on the pressure selected for the cycle), or even to approximately 400° C. if slightly overheated vapor is used in the PTC stage;
b) Three-dimensional sc means (including the receiver) consisting of a heliostat field and a central tower (2) for overheating the vapor produced by the PTC stage;
c) A low-temperature thermal storage device (3);
d) A high-temperature thermal storage device (4);
e) A fossil fuel support device (5);
f) A turbine (6) coupled mechanically to an electric generator (7);
g) A condenser (8);
h) A pump (9).

The energy supply in a Rankine cycle for the overheating stage implies (with the temperatures specified above) only about 18% of the total energy supply to the cycle. This will allow designing a combined plant with a thermal power at the design point of the parabolic trough field of 82% of the thermal power required for the power block, the remaining 18% being provided by the heliostat field. The use of overheated vapor can allow implementing thermodynamic cycles of higher efficiency in the plants. For example, an 11 MWe plant with a saturated vapor cycle gives cycle yields of 28.5%. A plant of similar proportions using overheated vapor can incorporate cycles with yields of about 35% to 38% depending on the process temperature and pressure, which implies increasing the annual plant output by 20% or 30%.

To allow the plant to combine the two technologies in an efficient manner, it is important to consider their cosine effect; this is the variation of the solar power that can be used by TCP technology and the three-dimensional concentration technology (heliostat field and tower) throughout the year. In order to size the combined system properly there are several alternatives depending on the latitude and radiation of the plant location. The modes of operation described below are restricted to PTC plants with a N-S orientation (E-W tracking) combined with central receiver technology in latitudes similar to that of Spain.

To execute the overheating stage exclusively with solar power, we must oversize the heliostat field to ensure that in the summertime there is always 18% of solar power available for overheating. This will imply a size of the heliostat field at the design point slightly greater than 18%, leading in winter to excess power available for overheating; thus, this excess power must be used for the low and medium temperature preheating and evaporation processes. The overheating stage can also be executed with support of gas, so that it is not necessary to oversize the heliostat field to compensate the lack during the summer and the excess power for overheating in winter will be less. Another way to compensate the seasonal and daily differences is to use a heat storage system. This allows softening the phase differences of the systems. The combined use of fossil fuel support, storage system and proper sizing of the two-dimensional and three-dimensional concentration systems will lead to optimum operation conditions in each case.

The invention claimed is:

1. A method of generating electricity under a Rankine thermodynamic cycle, the method comprising:
   a) providing a solar concentrator electric plant;
   b) generating saturated water vapor at a pressure of at least 96 bar utilizing a two-dimensional solar concentrator from water;
   c) subsequent to step b) generating overheated water vapor utilizing a three-dimensional concentrator from the saturated water vapor;
   d) subsequent to step c) generating electricity using a steam turbine from the overheated water vapor;
   e) in a first operating condition, flowing the water in a continuous cycle through a piping system so as to flow in sequence through the two-dimensional solar concentrator, the three-dimensional solar concentrator, the turbine and back to the two-dimensional solar concentrator; and
   f) in a second operating condition, flowing the water in a continuous cycle through a piping system so as to flow in sequence through the two-dimensional solar concentrator, through a back up fossil fuel generator adapted to provide backup heat to the water, through the turbine, and back to the two-dimensional solar concentrator, bypassing the three-dimensional solar collector.

2. The method according to claim 1, wherein the step of generating saturated water vapor includes heating the water to at least 310° C.

3. The method according to claim 1, wherein the step of generating overheated water vapor includes heating the saturated water vapor to at least 520° C. and at least 18% of solar energy used to heat the fluid is produced in the three-dimensional solar concentrator.

4. The method according to claim 1, further comprising, in a third operating condition:
   flowing the water in a continuous cycle through a piping system so as to flow in sequence through a back up fossil fuel generator adapted to provide backup heat to the water, through the turbine, and back to the back up fossil fuel generator, bypassing both the two-dimensional solar collector and the three-dimensional solar collector.

5. A solar concentrator plant utilizing water as a working fluid in a Rankine cycle for creating a thermal power supply, the plant comprising:
   a) a two-dimensional solar concentrator assembly adapted to provide about 82% of the thermal power supply and to convert the water to saturated water vapor, wherein the water is heated in the two-dimensional solar concentrator assembly to at least 310° C.; and
   b) a three dimensional solar concentrator assembly comprising a heliostat field and a central receiver tower, the assembly being adapted to provide no less than 18% of the thermal power supply and to convert the saturated water vapor to overheated water vapor, wherein the saturated water vapor is heated to at least 520° C.;
   c) a turbine for utilizing the overheated water vapor to produce electricity; and including piping wherein the water flows in a loop from the two-dimensional solar concentrator assembly, then to the three dimensional solar concentrator assembly, then to the turbine and then back to the two-dimensional solar concentrator assembly;
   d) a backup fossil fuel generator; and
   e) a bypass of the three-dimensional solar concentrator, so as to operably provide flow of the working fluid in a continuous cycle first through the two-dimensional solar concentrator, then through the back up fossil fuel generator, then through the turbine after which the fluid is returned to the two-dimensional concentrator.

6. The solar concentrator plant according to claim 5, further comprising a second bypass of both the two-dimensional concentrator and the three-dimensional concentrator, so as to operably provide flow of the working fluid in a continuous cycle first through the back up fossil fuel generator, then through the turbine after which the fluid is returned to the back up fossil fuel generator.

7. A method of creating a supply of thermal power, comprising:
   a) providing a solar concentrator plant with water as a working fluid including a two-dimensional solar concentrator assembly and a three-dimensional solar concentrator assembly;
   b) flowing the water through the two-dimensional solar concentrator and converting the water therein to saturated water vapor at a pressure of at least 96 bar, so that about 82% of a total supply of thermal power is generated in the two dimensional solar concentrator;
   c) after step b) flowing the water through the three-dimensional solar concentrator and converting the saturated water vapor therein to overheated water vapor, such that no less than 18% of the total supply of thermal power is generated in the three dimensional solar concentrator;
   d) after step c flowing the water through a turbine and generating electricity therein;
   e) during the method, in a first operating condition, flowing the water sequentially through the two-dimensional solar concentrator, the three-dimensional solar concentrator, the turbine and back to the two-dimensional solar concentrator in a continuous loop wherein the water does not utilize a heat exchanger heat transfer interface with flows from other process equipment while circulating in the loop; and
   f) in a second operating condition, flowing the working fluid in a continuous cycle through a piping system so as to flow in sequence through the two-dimensional solar concentrator, through a back up fossil fuel generator adapted to provide backup heat to the working fluid, through the turbine, and back to the two-dimensional solar concentrator, bypassing the three-dimensional solar collector.

8. A method according to claim 7, wherein the step of converting water to saturated water vapor includes heating the water to at least 310° C.

9. A method according to claim 7, wherein the step of converting saturated water vapor to overheated water vapor includes heating the saturated water vapor to at least 520° C.

10. The method according to claim 7, further comprising, in a third operating condition:
   flowing the working fluid in a continuous cycle through a piping system so as to flow in sequence through a back up fossil fuel generator adapted to provide backup heat to the working fluid, through the turbine, and back to the back up fossil fuel generator, bypassing both the two-dimensional solar collector and the three-dimensional solar collector.

11. A solar concentrator plant for producing electricity from sunlight and utilizing a single working fluid in a flow path; the plant comprising:
- a) a solar two dimensional concentrator for heating the fluid to at least 310° C. and producing saturated water vapor;
- b) a solar three dimensional concentrator for heating the saturated water to at least 520° C. and producing overheated water vapor;
- c) a steam turbine receiving the overheated water vapor to generate electricity;
- d) a piping system operably providing flow of the working fluid in a continuous cycle first through the two-dimensional concentrator, then through the three-dimensional concentrator, then through the turbine after which the fluid is returned to the two-dimensional concentrator; and
- e) a backup fossil fuel generator adapted to provide backup heat to a side stream of the water through a heat exchanger;

wherein the piping system comprises a bypass of the three-dimensional concentrator, so as to operably provide flow of the working fluid in a continuous cycle first through the two-dimensional concentrator, then through the back up fossil fuel generator, then through the turbine after which the fluid is returned to the two-dimensional concentrator.

12. The plant according to claim 11,
wherein the piping system further comprises a second bypass of both the two-dimensional concentrator and the three-dimensional concentrator, so as to operably provide flow of the working fluid in a continuous cycle first through the back up fossil fuel generator, then through the turbine after which the fluid is returned to the back up fossil fuel generator.

13. A method of generating electricity, comprising:
- a) providing a solar concentrator plant as recited in claim 11; and
- b) generating electricity, wherein no less than 18% of the thermal power for generating the electricity originates from the overheated water vapor and a remainder of the thermal power for generating the electricity originates from the saturated water vapor.

\* \* \* \* \*